US006170317B1

(12) United States Patent
Juuri et al.

(10) Patent No.: US 6,170,317 B1
(45) Date of Patent: Jan. 9, 2001

(54) ARRANGEMENT FOR DETECTING A NEED FOR MAINTAINING A HYDRAULIC BREAKING APPARATUS

(75) Inventors: Kauko Juuri, Hollola; Eero Ojala, Villähde; Mika Oksman, Hollola, all of (FI)

(73) Assignee: Tamrock Oy, Tampere (FI)

( * ) Notice: Under 35 U.S.C. 154(b), the term of this patent shall be extended for 0 days.

(21) Appl. No.: 09/235,414

(22) Filed: Jan. 22, 1999

(30) Foreign Application Priority Data

Feb. 5, 1998 (FI) ..................................................... 980260

(51) Int. Cl.[7] ....................................................... G01N 3/32

(52) U.S. Cl. ............................................................ 73/11.03

(58) Field of Search ............................... 73/11.01, 11.03, 73/152.01, 152.43; 173/2, 24

(56) References Cited

U.S. PATENT DOCUMENTS 3,664,435 * 5/1972 Klessig .................................. 173/17
4,246,973 * 1/1981 Mayer ...................................... 173/8
4,928,521 5/1990 Jardine .
5,174,387 12/1992 Arndt et al. .
5,291,955 * 3/1994 Clark ...................................... 173/24

FOREIGN PATENT DOCUMENTS 0 336 490 10/1989 (EP) .

* cited by examiner

*Primary Examiner*—Max Noori
(74) *Attorney, Agent, or Firm*—Smith-Hill and Bedell

(57) ABSTRACT

The invention relates to an arrangement for indicating a need for maintaining a hydraulic breaking apparatus, the arrangement comprising means for measuring at least one parameter describing the loading of the apparatus. The invention also comprises an indicator which is specific for each breaking apparatus and which is arranged to indicate visually, for example by means of LED lamps, that the parameter measured has exceeded the limit value determined in advance for maintenance.

15 Claims, 2 Drawing Sheets

ARRANGEMENT FOR DETECTING A NEED FOR MAINTAINING A HYDRAULIC BREAKING APPARATUS

Figure 1:
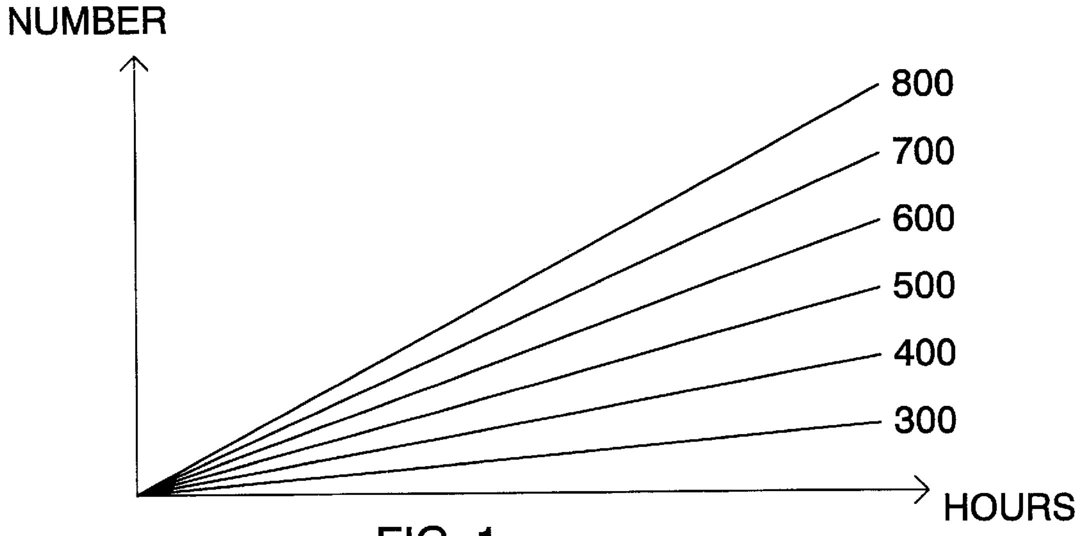

The invention relates to an arrangement for detecting a need for maintaining a hydraulic breaking apparatus, the hydraulic breaking apparatus comprising means for supplying hydraulic pressure into and removing it from the breaking apparatus, a percussion piston that reciprocates due to the action of the hydraulic pressure, and a tool whose upper end is subjected to an impact delivered by the percussion piston during the breaking, and measuring means for measuring at least one parameter describing the loading of the breaking apparatus.

Hydraulic breaking apparatuses, which in the present application refer to hydraulically driven percussion hammers, are used to break relatively hard materials, such as stones, concrete, asphalt etc. Such percussion hammers comprise a percussion piston, which performs a reciprocating movement due to the action of the hydraulic fluid and which is arranged to deliver an impact at the upper end of a tool placed against the surface to be broken. When the percussion piston hits the upper end of the tool at a high speed, it causes a great force effect at the tool, whereafter the surface against which the tool is placed will break or the tool will penetrate into the material to be broken. If the surface to be broken is especially hard, the tool bounces back from the surface due to the impact.

Hydraulic breaking apparatuses, such as percussion hammers and the like, require maintenance as any other technical devices. The purpose of maintenance is to ensure that the percussion hammer operates effectively during the entire expected lifetime of the hammer. If maintenance operations are not carried out regularly, the apparatus will be subject to repeated failures and premature wearing and, eventually, it will be discarded earlier than usual. Recurrent failures cause not only considerable repair costs but also breaks in the normal productive use, which in turn increases the expenses substantially. Also, the apparatus might become substantially less safe if the required maintenance operations are not carried out or if they are timed incorrectly. Maintenance is even more important when considering the harsh conditions in which percussion hammers are typically used.

Maintenance operations are usually carried out at predetermined intervals according to an advance plan drawn up by the manufacturer. The plan usually requires that maintenance operations are carried out based on operating hour limits determined empirically or through calculation, or based on the time that has passed since the previous maintenance operation. It is common to determine a maximum maintenance interval based on calendar time, since for example lubricants become ineffective in time even if the apparatus is not used at all. On the other hand, the presently used maintenance interval that is based on operating hours is always more or less an average value, since there are differences between individual apparatuses as regards their facilities, for example, and more importantly, the conditions, manner and frequency of use of the apparatuses also vary considerably. The latter facts are taken into account to some extent by devising different maintenance programmes; there are different programmes for example for excavation operations and for demolishing buildings. Also, the frequency of failures may vary greatly depending on the operator of the apparatus.

The manufacturers usually determine the maintenance intervals of a percussion hammer according to the operating hours of the basic machine, such as an excavator or some other corresponding carrier. However, this is a rather uncertain method since the use of the basic machine is not comparable as such to the operating hours of the percussion hammer, but the ratio between the operating hours of the basic machine and the percussion hammer may vary greatly, even from 10 to 90%, depending on the breaking operation to be carried out. Further, determining the maintenance interval in this manner has the disadvantage that it is not possible to take into account the actual strain caused by impacts of different magnitude on the percussion hammer. When the object to be broken breaks under the tool of the breaking apparatus or when the tool is able to penetrate into the material to be broken, a return pulse that is reflected from the object to be broken is considerably weaker than when the object is hard and makes the tool bounce back due to the recoil. When the tool hits a hard spot, the strain imposed on the breaking apparatus is considerably greater since the tool is subjected to greater resistance. Such great strains are rather harmful to the durability of the apparatus in the long run and they increase substantially the need for maintenance of the percussion hammer. Unfortunately, with the present methods it is not possible to take into account this fact in any way. Further, it is not presently possible to detect incipient serious damages in the structure of the percussion hammer before it is too late, whereupon the percussion hammer may already be damaged so badly that it cannot be repaired before the damage is detected in the next maintenance operation carried out according to the operating hours of the basic machine.

The purpose of the present invention is to provide a better arrangement for detecting a need for maintaining a percussion hammer than previously, taking into account the loading caused by the actual use of the percussion hammer and the subsequent need for maintenance.

The arrangement according to the invention is characterized in that it comprises an independently operating indicator which is placed in connection with the breaking apparatus, which indicator is specific for each apparatus, and which is arranged to indicate visually, for example by means of LED lamps, that the parameter measured with the measuring means provided in connection with the indicator has exceeded the limit value determined in advance for maintenance.

The basic idea of the invention is that the loading of the breaking apparatus is measured continuously with at least one sensor. The sensor is arranged to measure at least one preselected parameter, which describes the loading imposed on the structure of the percussion hammer by the impacts delivered by the percussion piston. The object is not to actually measure the loading or condition of an individual component, but to measure the loading imposed on the entire breaking apparatus. The essential idea of a preferred embodiment of the invention is to measure the number of actual impacts delivered by the percussion hammer and to indicate a need for maintenance of the apparatus when a predetermined number of impacts have been delivered. Further, the basic idea of another embodiment of the invention is to measure the magnitude of a desired parameter and to set for the measuring value a predetermined limit which is exceeded when an impact that is significant for the loading of the breaking apparatus and for the need for maintenance has been delivered. By means of the invention, such impacts exceeding a certain loading limit are registered, and when an empirically determined or calculated loading level or accumulated load is reached, the apparatus is considered to require maintenance. Such impacts with a great loading effect are considerably more significant for the wearing and breakage of the breaking apparatus than normal blows. Further, the basic idea of a third preferred embodiment of the invention is that the loading data measured with measuring sensors is analyzed more accurately in order that permanent changes occurring in the percussion hammer can be detected. Such permanent changes in the measurement results indicate that the components of the breaking apparatus are worn or that one or several of the components are being damaged or have already become damaged. With such monitoring it is possible to carry out maintenance operations in the form of proactive maintenance, and the occurrence of total damage in the breaking apparatus is also prevented.

The invention has the advantage that maintenance operations are carried out properly and at the correct time, in other words not too early and not too late. This reduces costs considerably, on the one hand since unnecessary maintenance operations are not carried out and, on the other hand, since the unobserved development of extensive and costly damages in the breaking apparatus is prevented. Since the maintenance operations are carried out according to the result of the measurement, they are timed much more accurately than previously. By means of the invention, it is possible to calculate accurately all the impacts delivered by the percussion hammer and to calculate separately the strongest impacts that are critical for loading and, if required, the accumulated load they produce. By means of the measurement of loadings according to the invention, it is also possible, if desired, to determine individual maintenance intervals for each breaking apparatus. A preferred embodiment of the invention where permanent changes taking place in the measurement results are also analyzed has an advantage that an incipient damage is detected well in advance so that more extensive damages in the hammer can be prevented. Therefore, it is possible to avoid high repair costs caused by serious damages and long breaks in the production. The invention can thus be applied according to the principle of preventive maintenance, in other words, the repairs can be scheduled in advance so that they are carried out when they interfere with the productive use of the apparatus the least.

The invention will be described in greater detail in the accompanying drawings, in which FIG. 1 shows schematically the number of impacts delivered by a percussion piston in relation to the frequency of impacts and the hours of hammer work used, and FIGS. 2 to 6 show schematically possible measurement parameters that can be used in detecting a need for maintaining a percussion hammer.

FIG. 1 shows the number of impacts delivered by a percussion hammer in relation to the number of hours of hammer work. The vertical axis describes the number of impacts delivered by the percussion hammer and the horizontal axis, in turn, describes the hours of hammer work. Different impact frequencies, for example between 300 and 800 impacts per minute, are shown in the figure next to straight lines describing them. As shown in the figure, the number of impacts is directly proportional to the impact frequency used and to the number of hours of hammer work. In other words, the greater the impact frequency and the number of operating hours of the percussion hammer, the greater the number of impacts delivered by the percussion piston. In principle, the need to maintain the percussion hammer increases in proportion to the delivered impacts due to normal wearing. By means of the invention, it is possible to measure the impacts that the percussion piston has actually delivered, so that the frequency of use of the apparatus can be determined accurately and it is no longer merely estimated. In the simplest case, the limits of the maintenance interval can be the actual impacts of the percussion piston, and when the limits are exceeded, predetermined maintenance operations will be carried out.

Figure 2:
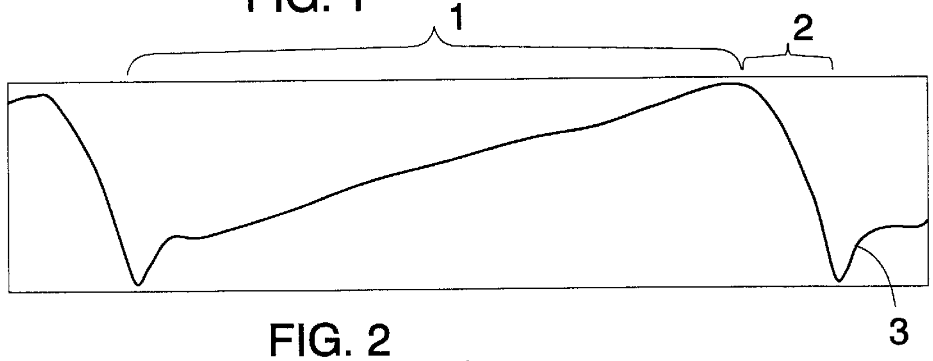

FIG. 2 shows schematically a manner of calculating impacts delivered by the percussion hammer when the movement of the percussion piston is used as a measurement parameter. In the figure, reference numeral 1 denotes a lift of the piston and numeral 2 denotes an impact. The piston is lifted during the lifting stage 1 to its uppermost position, i.e. to the upper dead point, from which it is struck rapidly downwards during the impact 2 towards the upper end of the tool. The operating cycle of the percussion piston is illustrated in the figure. When the cycles of the percussion piston are calculated, it is possible to determine the exact number of impacts delivered by the percussion piston. The measurement can be carried out for example as non-contacting measurement from the space at the top of the piston such that the position of the upper end of the piston is measured by means of suitable motion sensors, for example. This manner of measurement also makes it possible to determine the loading effect of the delivered impact, since the recoil following the impact and the return pulse 3 of the piston can be seen in the curve as a reverse movement that is faster than the rest of the lifting stage 1. This is due to the fact that the tool bounces back from the surface to be broken at a great initial speed after the impact. A predetermined limit may be set for the strength of the return pulse 3, and the pulses that exceed the limit are particularly significant as regards the loadings and the maintenance operations. Such pulses are registered, and when a certain number of pulses have been registered or when the accumulated load calculated on the basis of the pulse magnitude has reached its limit, the operator is notified of a need for maintenance of the breaking apparatus.

Figure 3:
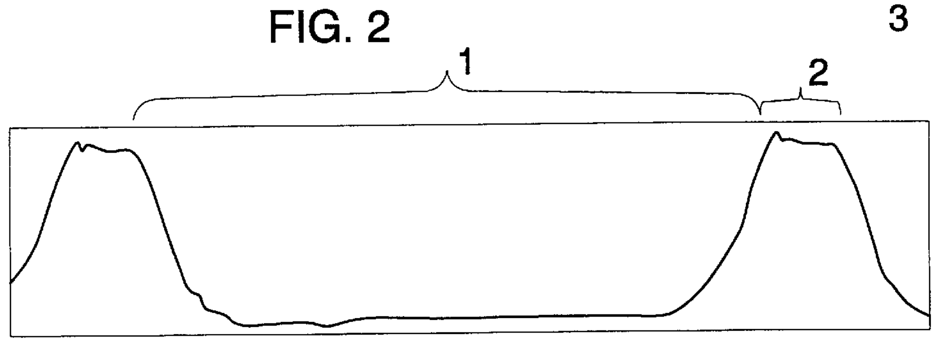

FIG. 3 shows schematically another manner of calculating impacts delivered by the percussion hammer by using the movement of the hammer main valve for the detection. The main valve that controls the piston performs a reciprocating movement during one operating cycle. The movement of the main valve can be measured with a suitable motion sensor from the end of the slide. As shown in FIG. 2, FIG. 3 also shows a lift of the piston 1 and an impact 2, in other words the entire operating cycle of the breaking apparatus.

Figure 4:
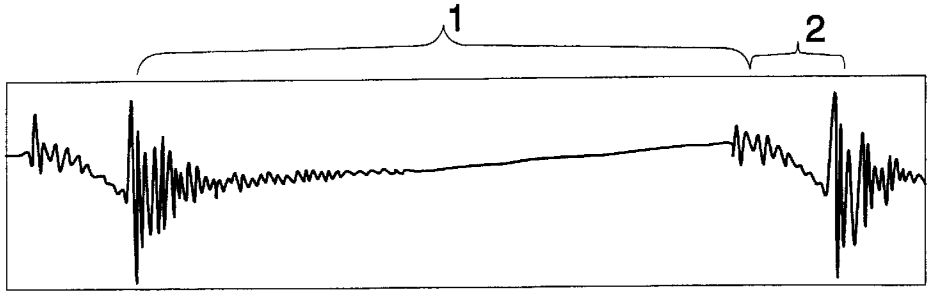

FIG. 4 shows schematically a third manner of calculating impacts delivered by the percussion hammer through measuring, by means of pressure sensors, the high pressure supplied to the hammer. The curve depicted in the figure also shows a lift of the piston 1 and an impact 2, which are illustrated in the curve as pressure pulsation. If required, these pressure signals can be processed such that the changes occurring therein can be registered and the condition of the percussion hammer can be estimated on the basis of a change that has taken place. When the tool of the apparatus hits a hard, unyielding surface with great force during the breaking, the tool bounces back from the surface at a great speed and produces a pressure impulse in the pressure reservoir situated above the percussion piston. On the basis of the strength of this pressure impulse, it is possible to determine the loading effect of the impact that was delivered. Impulses exceeding a predetermined threshold are calculated, and when a predetermined number of such impacts that are critical for the loading of the breaking apparatus have been delivered, the apparatus requires maintenance. On the other hand, it is also possible to calculate the accumulated load caused by partial loadings imposed on the apparatus, and when the accumulated load has reached a predetermined limit, the breaking apparatus is in need of maintenance.

Figure 5:
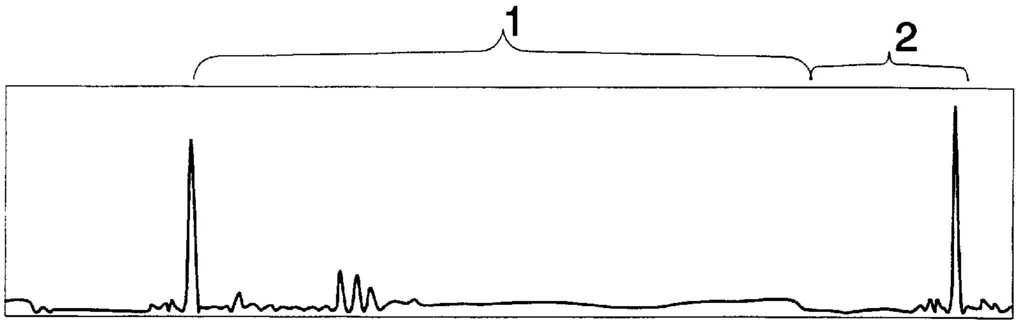

FIG. 5 shows schematically a manner of calculating impacts delivered by the percussion hammer by means of tank pressure of the hammer. Also when the tank pressure is measured, a lift of the piston 1 and an impact 2 can be detected.

Figure 6:
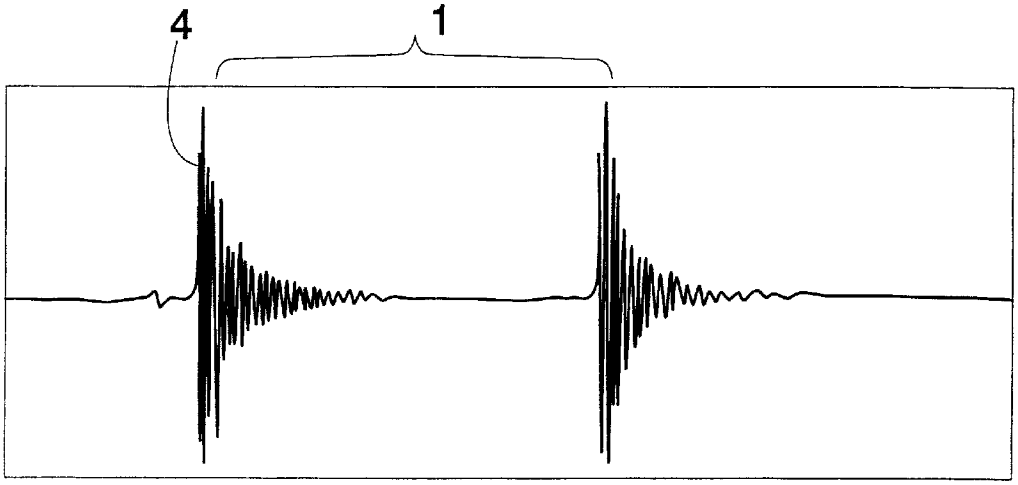

FIG. 6 shows schematically a curve illustrating frame vibration in the breaking apparatus. The frame vibration of the percussion hammer can be measured for example by means of acceleration or strain-gauge transducers. The curve clearly shows the moment of the piston stroke 4 as high-frequency vibration, which results from the piston hitting the tool and the vibration being transferred via the tool to the frame of the percussion hammer. The vibration is dampened gradually in the structures of the percussion hammer before the next impact. When breakage operations are carried out at great capacities and the object to be broken is hard, the breaking apparatus will be subjected to great loads that are detected as strong frame vibration. The number of impacts that are critical for the loading of the breaking apparatus can thus be calculated, and when a predetermined number of strong impacts have been delivered, the apparatus is clearly in need of maintenance. The magnitude and damping of the vibration can be analyzed further, and conclusions about the condition of the percussion hammer can thereafter be drawn based on the analysis. A worn or damaged percussion hammer generates vibration frequencies and amplitudes that are different from those produced by a hammer in good condition. In this manner, surprising premature failures and wearing also become evident. An accurate analysis may reveal failures even in individual components. Further, limits may be set for the maximum value of vibration, and exceeding these limits produces a signal that indicates a need for maintenance before the apparatus will be damaged more, since a rapid increase in vibrations usually indicates that a component has become damaged.

In practice, loadings can be measured for example such that a loading indicator is placed in connection with the hydraulic breaking apparatus, and the purpose of the indicator is to indicate clearly to the operator that a predetermined impact or loading limit has been exceeded and the maintenance interval of the apparatus has thus elapsed. The indicator is preferably an independent unit, such as a measuring and indicating device that is fastened directly to the breaking apparatus and that is specific to the percussion hammer. The indicator comprises a sensor that measures the loading of the breaking apparatus, means for registering loadings, means for processing loading data, if required, indicating means for indicating a need for maintenance, and preferably a separate power source so that there is no need for external electrical power or separate cables to the basic machine. The indicating means may be for example LED lamps that go on when the apparatus needs maintenance. The indicator is preferably placed such that the operator of the breaking apparatus can easily see a signal provided by the indicator while working. The construction of the indicator can be made so economical that the indicator can be replaced in connection with each maintenance operation. The indicator can also be implemented such that it lasts over several maintenance periods and the impact counter of the indicator can be reset and the power source can be charged in connection with each maintenance. Further, the indicator can be made such that it is activated only when it detects that the hammer is delivering an impact. Another manner of implementing an indicator is that it comprises means for generating the electrical power it needs for example through induction from the motion of the percussion piston. An indicator that is replaced in connection with each maintenance operation typically has permanently programmed alarm limits, and when the limits are exceeded the indicator generates a desired signal. When an indicator with a longer operating interval is used, it is possible to programme in the indicator the limit values selected for the breaking apparatus in question separately for each maintenance interval, if desired, for example by means of a separate PC in connection with the maintenance operations. The indicator must be made strong and tight mechanically, since it is fastened to the breaking apparatus where it is constantly exposed to vibration and impacts, as well as moisture, dust and other impurities. The electronic components and the other sensitive parts of the indicator are preferably cast into a tight package by means of suitable sealing compounds.

The drawings and the description related thereto are only intended to illustrate the inventive idea. The details of the invention may vary within the scope of the claims. Therefore, several other means may be used to measure loadings in addition to the aforementioned measurement signals and sensors. For example, acoustic sensors may be used as motion sensors, and vibration can also be measured by means of piezoelectric acceleration transducers. There are also other possible manners of measuring the loading of a breaking apparatus than those disclosed herein.

In yet another embodiment, the number of impacts delivered by the percussion hammer is calculated and another parameter is also measured simultaneously. In such a case, the apparatus can be taken to maintenance even if a predetermined maintenance limit regarding the number of impacts has not been reached, but the other parameter that is measured indicates a need for maintenance. On the other hand, measurement data provided by several parameters to be measured can be used such that the actual impacts of the percussion hammer are calculated, and if required, the number of impacts determined as the maintenance limit is lowered if some other parameter to be measured indicates that the loadings imposed on the apparatus are greater than predicted.

The sensors can also be made to measure the noise generated in the structures of the breaking apparatus. Greater loads naturally produce a louder sound. Also, the noise caused by the use of the apparatus normally increases as the apparatus wears and the components become damaged. Another measurement parameter may be the temperature, which varies according to the loading. Worn or damaged components also raise the temperature. It is also possible to measure oil leaks that are caused inside the apparatus by possible clearances and breakdowns, and the condition and maintenance need of the apparatus can be determined on the basis thereof.

What is claimed is:

1. A monitor for determining need for maintenance of a hydraulic impact breaker which is mounted to a carrier vehicle and includes a means for supplying hydraulic fluid to and removing hydraulic fluid from the impact breaker, a percussion piston which reciprocates due to the action of the hydraulic fluid, and a tool having an end which is subject to an impact delivered by the percussion piston during the breaking, the monitor comprising:

a measuring means for measuring the value of at least one parameter that depends on loading of the impact breaker and providing an output in the event that the value of the parameter exceeds a predetermined limit value, and an indicator which is responsive to the output provided by the measuring means to provide a visual indication that the measured value of the parameter exceeds the predetermined limit value, and wherein the monitor is mounted directly on the impact breaker.

2. A monitor according to claim 1, wherein the parameter is the number of impacts delivered by the impact breaker and the measuring means counts the number of impacts and the indicator provides a visual indication when the number of impacts exceeds a predetermined limit value.

3. A monitor according to claim 1, wherein the measuring means measures the magnitude of impacts delivered by the impact breaker and the parameter is the number of impacts of magnitude exceeding a predetermined loading limit, such that the output is provided when a predetermined number of impacts exceeding said loading limit have been delivered.

4. A monitor according to claim 1, wherein the measuring means measures the magnitude of impacts delivered by the breaking apparatus and the indicator registers the loading effect of the impacts and provides said output when the accumulated load formed of the loading effect of individual impacts exceeds a predetermined limit.

5. A monitor according to claim 1, wherein the measuring means senses the magnitude of impacts delivered by the breaking apparatus and provides said output when the magnitude of the loading produced by an individual impact exceeds a predetermined threshold.

6. A monitor according to claim 1, wherein the measuring means measures the magnitude of impacts delivered by the breaking apparatus and includes a means for analyzing the measurement result and providing said output when the analysis detects an incipient or existing failure in the breaking apparatus.

7. A monitor according to claim 1, comprising a means for measuring a return pulse of the percussion piston.

8. A monitor according to claim 1, comprising a means for measuring pressure pulses in the hydraulic fluid supplied to the impact breaker.

9. A monitor according to claim 1, wherein the impact breaker includes a frame and the monitor comprises a means for measuring vibrations in the frame of the impact breaker.

10. A monitor according to claim 1, wherein the indicator stores alarm limits.

11. A monitor according to claim 1, wherein the indicator is activated only when it detects that the percussion piston is delivering an impact.

12. A monitor according to claim 1, wherein the indicator includes a means for generating electrical operating power.

13. A monitor according to claim 12, wherein the means for generating electrical operating power operates through induction from the motion of the percussion piston.

14. A monitor according to claim 1, wherein the indicator includes at least one light-emitting diode.

15. A monitor according to claim 1, wherein the indicator is mounted on the impact breaker at a position for displaying the visual indication to an operator of the impact breaker.

* * * * *